United States Patent
Sabripour (10) Patent No.: US 11,144,796 B2
(45) Date of Patent: *Oct. 12, 2021

(54) METHOD AND APPARATUS FOR DISTRIBUTED EDGE LEARNING

(71) Applicant: MOTOROLA SOLUTIONS, INC., Chicago, IL (US)

(72) Inventor: Shervin Sabripour, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/654,375

(22) Filed: Oct. 16, 2019

(65) Prior Publication Data

US 2020/0050903 A1     Feb. 13, 2020

Related U.S. Application Data (63) Continuation of application No. 15/668,624, filed on Aug. 3, 2017, now Pat. No. 10,489,693.

(51) Int. Cl.
*G06K 9/00* (2006.01)
*G06K 9/66* (2006.01)
*G06N 3/08* (2006.01)

(52) U.S. Cl.
CPC .......... *G06K 9/66* (2013.01); *G06K 9/00791* (2013.01); *G06N 3/08* (2013.01)

(58) Field of Classification Search
None
See application file for complete search history.

(56) References Cited

U.S. PATENT DOCUMENTS

| 6,889,165 | B2* | 5/2005 | Lind | G01D 9/005 |
| | | | | 702/182 |
| 7,272,613 | B2 | 9/2007 | Sim et al. | |
| 10,489,693 | B2* | 11/2019 | Sabripour | G06N 3/08 |
| 2007/0192872 | A1* | 8/2007 | Rhoads | H04N 1/32144 |
| | | | | 726/26 |

(Continued)

FOREIGN PATENT DOCUMENTS

WO    2017/116635    7/2017

OTHER PUBLICATIONS

International Preliminary Report on Patentability dated Feb. 13, 2020 for related International Application No. PCT/US2018/042528 (7 pages).

(Continued)

*Primary Examiner* — Hadi Akhavannik
(74) *Attorney, Agent, or Firm* — Michael Best & Friedrich LLP (57) ABSTRACT

An object learning system, method, and device. The object learning device includes an electronic processor configured to provide an identifier based on target to at least one auxiliary object learning device and initiate an edge learning process on the target to create first preprocessed object recognition data. The electronic processor is further configured to receive second preprocessed object recognition data corresponding to the target from the at least one auxiliary object learning device and create, based on the first and the second preprocessed object recognition data, a classifier of the target.

15 Claims, 7 Drawing Sheets

(56) References Cited

U.S. PATENT DOCUMENTS

| | | | |
|---|---|---|---|
| 2008/0014917 A1* | 1/2008 | Rhoads | G06Q 30/06 |
| | | | 455/422.1 |
| 2009/0055031 A1* | 2/2009 | Slota | H02J 3/42 |
| | | | 700/287 |
| 2009/0102835 A1* | 4/2009 | Mikhailov | G06T 7/12 |
| | | | 345/419 |
| 2015/0106311 A1 | 4/2015 | Birdwell et al. | |
| 2017/0024641 A1* | 1/2017 | Wierzynski | G06K 9/4628 |
| 2017/0185872 A1* | 6/2017 | Chakraborty | G06K 9/66 |
| 2019/0164020 A1 | 5/2019 | Sabripour | |

OTHER PUBLICATIONS

Examination Report No. 1 issued by the Australian Government for Application No. 2018311661 dated Aug. 6, 2020 (4 pages).
PCT/US2018/042528 International Search Report and Written Opinion of the International Searching Authority dated Oct. 15, 2018 (11 pages).
Examination Report issued by the European Patent Office for Application No. 18749991.8 dated Dec. 4, 2020 (5 pages).
Examination Report issued by the Canadian Patent Office for Application No. 3069537 dated Mar. 5, 2021 (4 pages).

* cited by examiner

METHOD AND APPARATUS FOR DISTRIBUTED EDGE LEARNING

The present application is a continuation application of U.S. patent application Ser. No. 15/668,624 filed in the United States Patent Office on Aug. 3, 2017, the entire contents of which is incorporated herein by reference.

BACKGROUND OF THE INVENTION

Public safety personnel increasingly use image capture devices while performing their duties. Image capture devices include, for example, a body worn camera, a camera-equipped unmanned aerial vehicle (a "UAV" or drone) or a vehicle-mounted device such as an in-vehicle dash camera. The increased presence of such devices enables automated object detection, for example, using artificial neural networks (referred to as "neural networks" hereafter). Neural networks may learn to recognize or identify an object by processing streams of data received from the image capture devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Quick and accurate identification of an object of interest can improve outcomes for public safety patrol and response efforts. However, some recognition methods implemented completely on the recognition device or a remote server may be slow and/or consume an undesirable amount of power and device memory. Some recognition devices implement real-time identification using analytic engines (for example, video), which utilize classifiers, neural networks, and the like to detect and identify objects. Generally, it is desirable to improve the accuracy and efficiency of creating classifiers.

Machine learning generally refers to the ability of a computer program to learn without being explicitly programmed. In some embodiments, a computer program (for example, a learning engine) is configured to construct a model (for example, one or more algorithms) based on example inputs. Supervised learning involves presenting a computer program with example inputs and their desired (for example, actual) outputs. The computer program is configured to learn a general rule (for example, a model) that maps the inputs to the outputs. The computer program may be configured to perform machine learning using various types of methods and mechanisms. For example, the computer program may perform machine learning using decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using all of these approaches, a computer program may ingest, parse, and understand data and progressively refine models for data analytics.

Neural networks create classifiers for automated object detection. However, the classifiers' effectiveness may be limited by the quality or quantity of training data provided for them. Training data on an object from one vantage point limits the accuracy of the detection engine, regardless of the learning process used. Modern image capture devices often include relative powerful computers capable of performing video analytics. Edge learning leverages this distributed processing power to perform some object detection and classifier training on the network edge. Accordingly, embodiments described herein provide, among other things, a partial edge intelligence characteristic recognition system and method.

One example embodiment provides an object learning device. The object learning device includes an electronic processor configured to provide an identifier, based on a target, to at least one auxiliary object learning device and initiate an edge learning process on the target to create first preprocessed object recognition data. The electronic processor is further configured to receive second preprocessed object recognition data corresponding to the target from the at least one auxiliary object learning device and create, based on the first and the second preprocessed object recognition data, a classifier of the target.

Another example embodiment provides a method of object learning on a distributed network. The method includes providing, via a master node, an identifier, based on a target, to at least one auxiliary node, initiating, via an electronic processor of the master node, an edge learning process on the target, and creating a first preprocessed object recognition data. The method further includes receiving, at the master node, a second preprocessed object recognition data from the at least one auxiliary node and creating, via the electronic processor, based on the first and the second object recognition data, a classifier of the target.

Another example embodiment provides an object learning system. The system includes an auxiliary object learning device including a first electronic processor and an object learning device including a second electronic processor. The first electronic processor is configured to initiate a first edge learning process on the target to create first preprocessed object recognition data. The second electronic processor is configured to provide an identifier, based on a target, to the auxiliary object learning device, initiate a second edge learning process on the target to create second preprocessed object recognition data, receive first preprocessed object recognition data corresponding to the target from the auxiliary object learning device, and create, based on the first and the second preprocessed object recognition data, a classifier of the target.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

Figure 1:
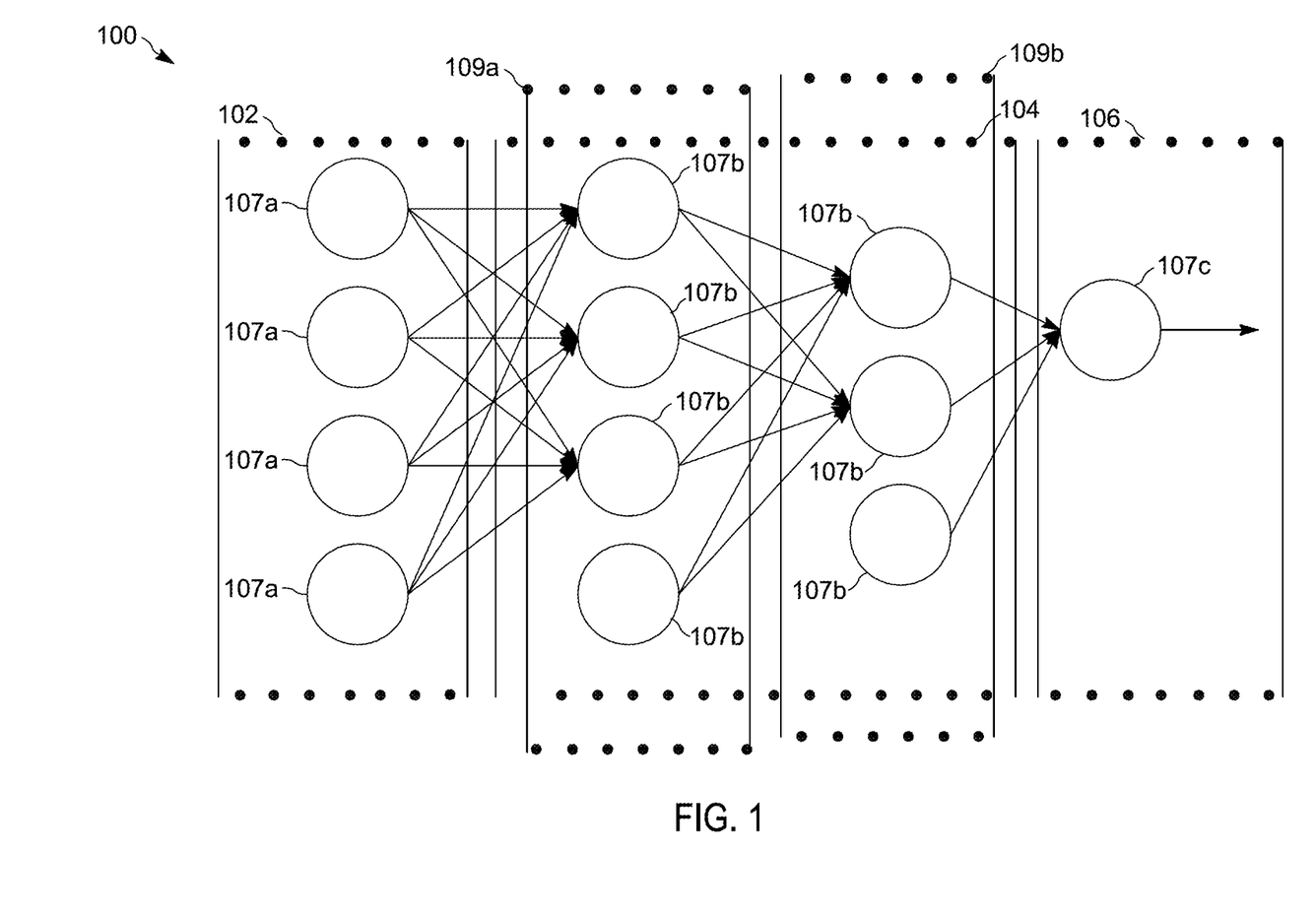
FIG. 1 is a diagram of an object learning system in accordance with some embodiments.

FIG. 1 is a diagram of an object learning network 100 in accordance with some embodiments. In the example illustrated, the network 100 is structured to be an artificial neural network or connectionist system. The network 100 includes three layers: an input layer 102, a hidden layer 104, and an output layer 106. Each layer may include one or more sublayers connected to a following sublayer within the same layer. For example, as illustrated in FIG. 1, the hidden layer 104 may include a first sublayer 109a and a second sublayer 109b. Each of the layers 102, 104, and 106 is stacked on top of the previous layer. The input layer 102 sends data to the hidden layer 104 and the hidden layer 104 sends data to the output layer 106. Sublayers within the layers are also stacked. For example, the first sublayer 109a (which receives data from the input layer 102) sends data to the second sublayer 109b and the second sublayer 109b sends data to the output layer 106. The first sublayer 109a may be considered a pre-processing layer.

Each layer 102, 104, and 106 include one or more object learning process nodes called neurons. Neurons within the input layer 102 are input neurons 107a. Neurons within the hidden layer 104 are hidden neurons 107b and neurons within the output layer 106 are considered output neurons 107c. Each neuron 107a-107c includes an object learning function. The input neurons 107a of the input layer 102 each receive input from the environment of the network 100 and each perform an object learning function on the input. The input neurons 107a output the results to the connected hidden neurons 107b of the hidden layer 104. The hidden neurons 107b each perform an object learning function on the data received from the input layer 102. When the hidden layer includes more than one sublayer, the output of the first sublayer 109a may produce preprocessed object recognition data. This preprocessed object recognition data is sent to hidden neurons 107b of the second sublayer 109b, an object learning function is applied, and each hidden neuron 107b of the second sublayer 109b outputs the resulting data to each of the output neurons 107c in the output layer 106.

One or more object learning devices 110 (see FIG. 2) are associated with each of the layers 102, 104, and 106. Each object learning device 110 includes an electronic processor configured to perform some or all one or more machine learning functions (for example, as described in more detail below with respect to a method 500 described in regard to FIG. 5). The object learning devices 110 process data that may be used to form some or all of the neurons 107a-107c of the layers 102, 104, and 106 the network 100.

The object learning devices 110 may include one or more edge learning devices 200. In some embodiments, the object learning device 110 may include one or more of a remote server 301 (see FIGS. 2 and 3). As used herein, the terms "object learning device" and "object learning devices" may refer to the edge learning devices 200 and the remote server 301 individually or collectively. Each object learning device 110 is connected to at least one other object learning device 110 and is configured to send data forward to the next object learning device(s) 110 associated with the subsequent layer or sublayer. As described in more detail below, the object learning devices 110 are configured to produce preprocessed object recognition data using a sub-network (or a sub-neural network). The preprocessed object recognition data is then parsed or integrated to form a main object learning/neural network 600 (see FIG. 6).

Figure 2:
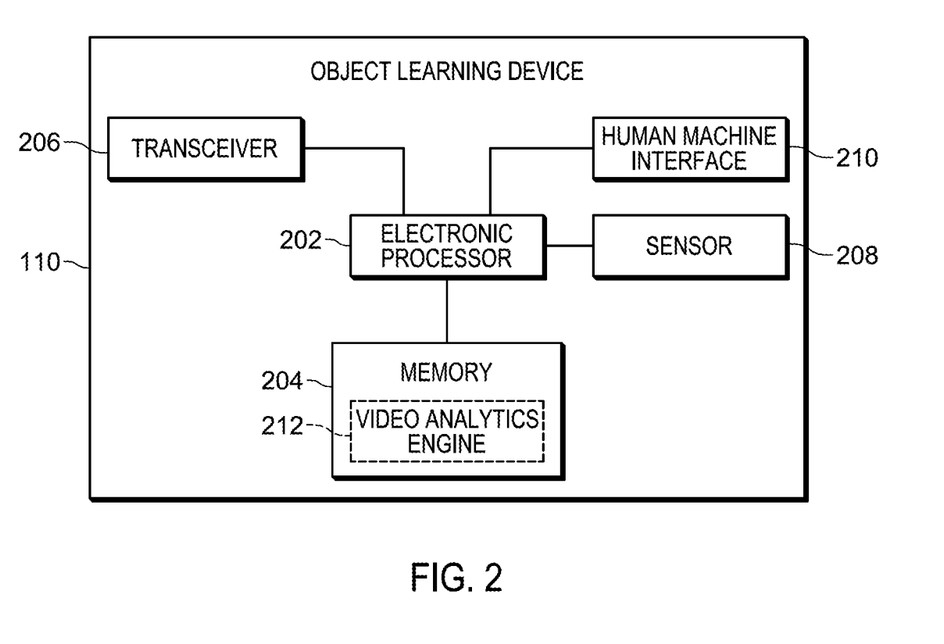
FIG. 2 is a diagram of an edge learning device in accordance with some embodiments.

FIG. 2 is a diagram of an object learning device 110 in accordance with some embodiments. In the example illustrated, the object learning device 110 is an electronic device that includes an electronic processor 202, a memory 204, a transceiver 206, and an image sensor 208. In some embodiments, the object learning device 110 may further include a human machine interface (HMI) 210. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The object learning device 110 is presented as an example that may be programmed and configured to carry out the functions described herein.

In some embodiments, the object learning device 110 may be a handheld device or a wearable device. For example, the object learning device 110 may be a portable communication device, such as, for example a portable two-way radio including a camera, a body-worn camera, a smart telephone, a tablet computer, and the like. In some embodiments, components of the object learning device 110 may be separately implemented, and may be communicatively coupled by a bus or by a suitable communication network. For example, the object learning device 110 may include a dash camera in a vehicle coupled to a mobile two-way radio, a network-connected portable computer, or similar device in or coupled to the vehicle. It should be understood that, in other constructions, the object learning device 110 includes additional, fewer, or different components than those illustrated in FIG. 2. In some embodiments, the object learning device 110 is a remote server, for example the remote server 301 (FIG. 3).

Figure 3:
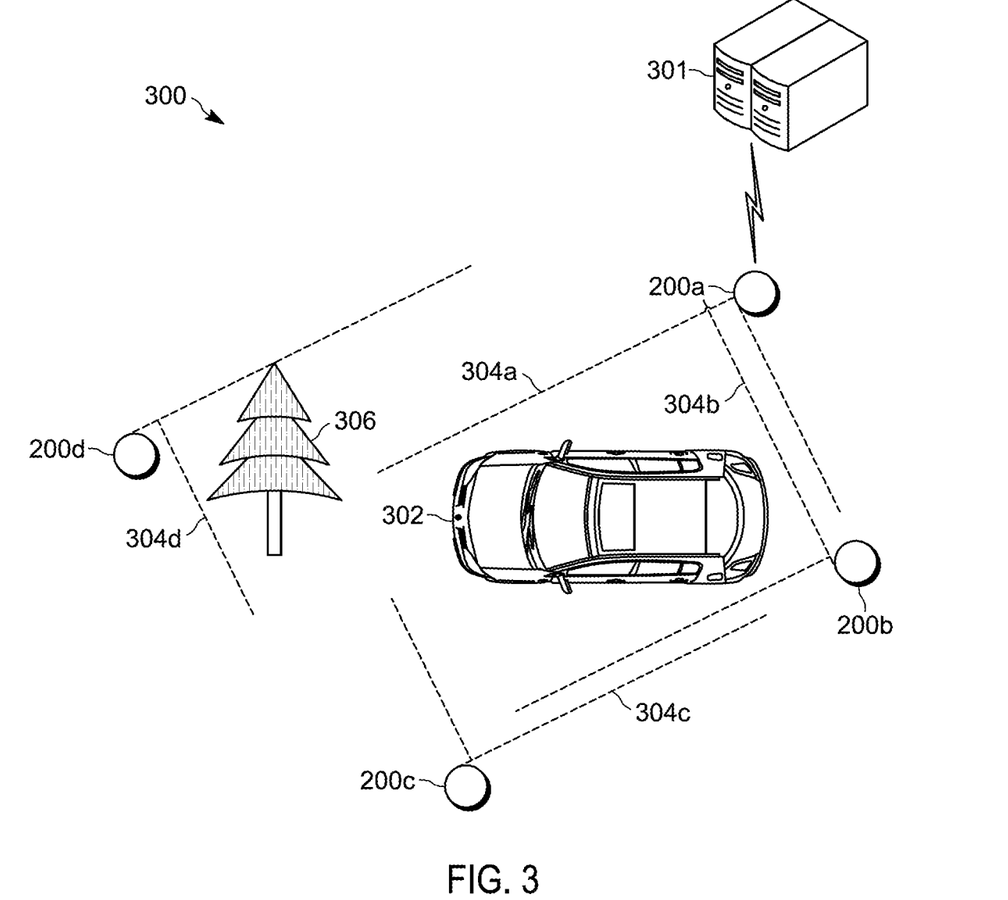
FIG. 3 illustrates an example object learning system according to some embodiments.

In some embodiments (for example, as illustrated in FIG. 3) the object learning device 110 is communicatively coupled to, and writes data to and from, a remote server 301. The remote server 301 may be a database server housing or having a database and communicatively coupled to and accessible by the object learning device 110. In alternative embodiments, the server 301 may be part of a cloud-based database system accessible by the object learning device 110 over one or more networks. It should be understood that in some embodiments the object learning device 110 may be configured to communicate and implement the methods described herein with the remote server 301. It should be understood that although only one remote server is shown and described in the example embodiment, multiple remote servers could be implemented in alternative embodiments.

The electronic processor 202 obtains and provides information (for example, from the memory 204, the transceiver 206, and/or the image sensor 208), and processes the information by executing one or more software instructions or modules, capable of being stored, for example, in a random access memory ("RAM") area of the memory 204 or a read only memory ("ROM") of the memory 204 or another non-transitory computer readable medium (not shown). The software can include firmware, one or more applications, program data, filters, rules, one or more program modules, and other executable instructions. The electronic processor 202 is configured to retrieve from the memory 204 and execute, among other things, software related to the control processes and methods described herein.

The memory 204 can include one or more non-transitory computer-readable media, and includes a program storage area and a data storage area. The program storage area and the data storage area can include combinations of different types of memory, as described herein. The memory 204 may take the form of any non-transitory computer-readable medium. In the embodiment illustrated, the memory 204 stores, among other things, a video analytics engine 212. The video analytics engine 212 analyzes video (and other media) to, among other things, identify and detect objects, shapes, motion, and the like within the video. The video analytics engine 212 is configured to execute at least part of an edge learning process to produce preprocessed object recognition data. As described below in regard to FIG. 5, the preprocessed object recognition data may be used for at least part of a data set for object learning in order to classify a target. In some embodiments, the video analytics engine 113 includes other features for object detection and video analysis, for example, gesture recognition.

In the example discussed, the target is a distinguishable being or inanimate object. The video analytics engine 212 is configured to learn the target based one or more physical or, in the case of a being, anatomical features determined from a view captured by the image sensor 208. For example, when the target is a human being the features of the target detected by the video analytics engine 212 may be one or more of a facial feature, a voice or vocal feature, a height, a hair color, a skin tone, a tattoo, a birthmark, an eye color, a body shape, a gait, a feature of a wearable article (for example, jewelry, a clothing color, clothing pattern, or a logo), or another physical feature, with which the person can reasonably be identified. The wearable article may be an article of clothing or a wearable accessory (for example, a piece of jewelry, a hat or headpiece, a bag, a purse, or a backpack) on the target.

The transceiver 206 is configured for wireless coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the object recognition device 110 may include a connector or port (not shown) for receiving a connection to a wired network (for example, Ethernet). The electronic processor 202 is configured to operate the transceiver 206 to receive input from and to provide system output, or a combination of both. The transceiver 206 obtains information and signals from, and provides information and signals to, (for example, over one or more wired and/or wireless connections) devices both internal and external to the object learning device 110.

The image sensor 208 is a device, for example a video sensor or a camera, designed or configured to capture a view of a target human or object. The image sensor 208 communicates the captured media to the electronic processor 202. In the context of the image sensor 208, the term "media" may refer to one or more digital images or video captured by the image sensor 208 or processed by the electronic processor 202. Although illustrated in FIG. 2 as being located within the object learning device 110, the image sensor 208 may be located outside of the object learning device 110. In some embodiments, more than one sensor 208 is implemented.

The human machine interface (HMI) 210 receives input from, and provides output to, users of the object learning device 110. The HMI 210 may include a keypad, switches, buttons, soft keys, indictor lights (for example, light emitting diodes (LEDs), haptic vibrators, a display (for example, a touchscreen), or the like. In some embodiments, the HMI 210 includes a suitable display such as, for example, a liquid crystal display (LCD) touch screen, or an organic light-emitting diode (OLED) touch screen. In such embodiments, the object learning device 110 implements a graphical user interface (GUI) (for example, generated by the electronic processor 202, from instructions and data stored in the memory 204, and presented on a display (not shown) of the HMI 210), that enables a user to interact with and control the object learning device 110.

FIG. 3 illustrates an example object learning system 300 according to some embodiments. The object learning system 300 includes one or more edge learning devices 200a-200d and the remote server 301 communicatively coupled to the edge learning device 200a. The edge learning devices 200a-200d are described in this example as object learning devices 110 that are portable electronic devices. In some embodiments, one or more of the edge learning devices 200a-200d may instead be a remote server 301. The edge learning devices 200a-200d are positioned in an area surrounding a target 302. The target 302 is a human or an object that is to be learned and classified by the object learning system 300. For example, the target 302 may be a vehicle, as illustrated in FIG. 3. The target 302 lies within a field of view 304a-304d (the field of view of the image sensor 208) of the edge learning devices 200a-200d. A field of view, for example the field of view 304d, may be obstructed by an obstacle 306.

Figure 5:
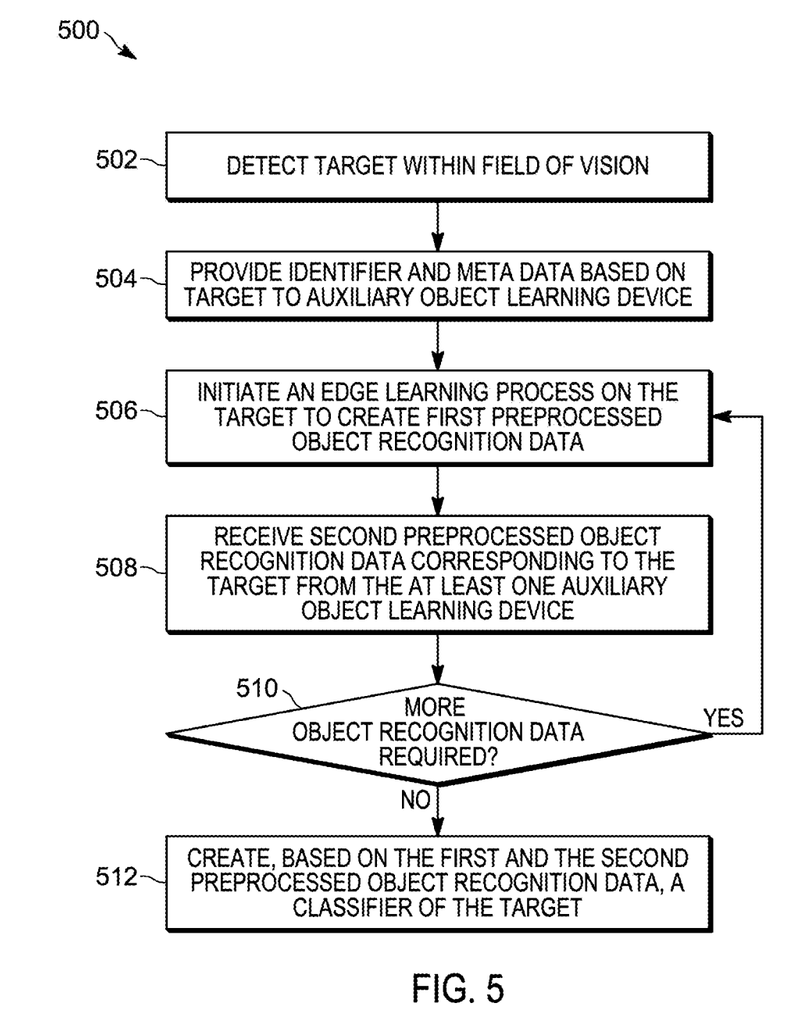
FIG. 5 is a flow chart of a method of recognizing a target in accordance with some embodiments.

FIG. 5 illustrates an example method 500 of object edge learning in a distributed network. As an example, the method 500 is described as being performed by the object learning system 300 illustrated in FIG. 3. However, it should be understood that the method 500 may be applied to different configurations of object learning systems. At block 502, the electronic processor 202 detects the target 302 via the image sensor 208 of the edge learning device 200a (see FIG. 3). In some embodiments, the target 302 may be selected by a user of the edge learning device 200a-200d, for example, via a graphical user interface or the human machine interface 210. In other embodiments, the electronic processor 202 receives information identifying the target 302 (for example, an identifier associated with the target 302) from a remote system, for example, a computer aided dispatch system or the remote server 301. When detected, the edge learning device 200a may collect additional metadata associated with the target 302.

At block 504, the electronic processor 202 of the edge learning device 200a provides the identifier based on the target 302 to one or more auxiliary object learning devices. The auxiliary object learning devices, for example, the edge learning devices 200b-200d (see FIG. 3) use the identifier to detect whether the target 302 is within their field of view 304b-304d.

Figure 4A:
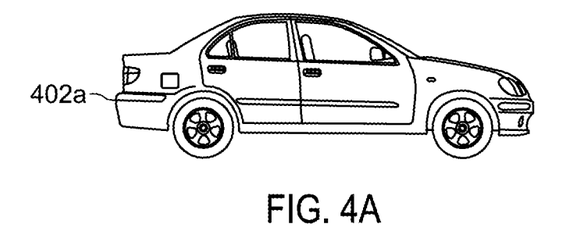
FIG. 4A is a view including a target captured by an object learning device of FIG. 2 of the system of FIG. 3.
Figure 4B:
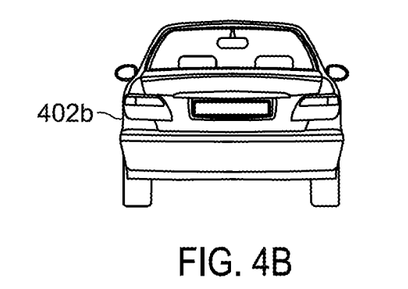
FIG. 4B is a view including a target captured by an object learning device of the system of FIG. 3.
Figure 4C:
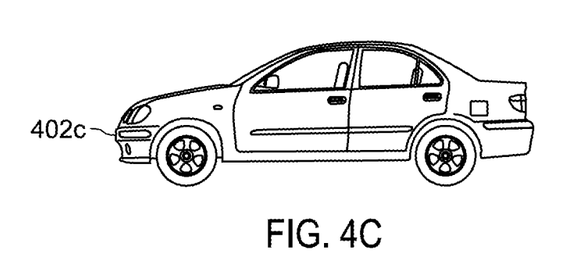
FIG. 4C is a view including a target captured by an object learning device of the system of FIG. 3.

At block 506, the electronic processor 202 of the edge learning device 200a initiates an edge learning process on the target 302 to create preprocessed object recognition data. The preprocessed object recognition data may be used for at least part of a data set for object learning. When the target is within the field of view of one or more of the auxiliary object learning devices 200b-200d, the auxiliary object learning devices 200b-200d may initiate its own edge learning process. The edge learning process performed on each of the object learning device 200a-200d may depend on an assigned weight of the object learning device 200a-200d relative to the other object learning devices 200a-200d within the object learning system 300. The preprocessed edge learning data created by the auxiliary object learning device 200a-200d may also depend on the view of the target within the field of view of the device 200a-200d. For example, FIGS. 4A-4D each illustrate a view 402a-402d of the target 302 within each of the fields of view 304a-304d of the edge learning devices 200a-200d. In FIG. 4A, the view 402a captured by the edge learning device 200a is a right side view of the target 302 while the view 402b in FIG. 4B captured by the edge learning device 200b is a rear view of the target 302. The resulting preprocessed object recognition data produced by the edge learning device 200a may be different from the preprocessed object recognition data produced by the edge learning device 200b.

In some embodiments, the edge learning process implemented by one or more of the edge learning devices 200a-200d is a partial or complete object learning/neural subnetwork. The subnetwork is structured and functions similarly in regard to the object learning network 100 of FIG. 1. When the edge learning device 200a-200d implements a full subnetwork, it utilizes neurons only using its own data and learning functions. When the edge learning device 200a-200d functions as a partial neural network, it utilizes data from one or more additional devices, for example additional object learning devices 110 (not shown), outside the system 300 to create the neurons and/or additional layers.

Returning to FIG. 5, at block 508, the electronic processor 202 of the edge learning device 200a receives preprocessed object recognition data corresponding to the target 302 from the at least one of the auxiliary edge learning devices 200b-200d (see FIG. 3). The edge learning device 200a may process the collected preprocessed object recognition data to create a learning data set. In some embodiments, as described in more detail in regard to FIG. 6, the preprocessed object recognition data received at the edge learning device 200a is used as neurons in the main object learning/neural network 608.

At block 510, the electronic processor 202 of the edge learning device 200a determines whether more preprocessed object recognition data corresponding to the target 302 is required for complete object learning. More object recognition data may be required when the collected preprocessed object recognition data begins to be redundant (that is, little or no new object recognition data regarding the target is received by the edge learning device 200a). Additional object recognition data may become available when the target 302 or the field of view 304a-304d of an edge learning device 200a-200d of the system 300 moves. In some embodiments, the edge learning device 200a is able to determine which of the edge learning devices 200b-200d within the object learning system 300 the edge learning device 200a receives redundant object recognition data from and may forward a request to the edge learning device to stop transmitting the object recognition data.

At block 510, when the object learning process is complete, the electronic processor 202 of the edge learning device 200a creates, based on the preprocessed object recognition data collected, a classifier of the target 302. In some embodiments, the edge learning device 200a may perform only some processing on the collected object recognition data and transmit the result to the remote server 301 so that the remote server 301 creates the classifier. When the edge learning device 200a creates the classifier, the classifier may be transmitted to a remote device or system, for example a computer aided dispatch system or the remote server 301. The object classifier may be used with machine learning to iteratively process images of the target and classify the object. For example, the receiving device or system uses the classifier to recognize (or classify) an object or the target 302.

Although the method 500 is described in terms of creating a classifier for a single target, it should be understood that the object learning device, for example the object learning devices 200a-200d may simultaneously determine classifiers of additional targets while performing the method 500 for a first target.

Figure 6:
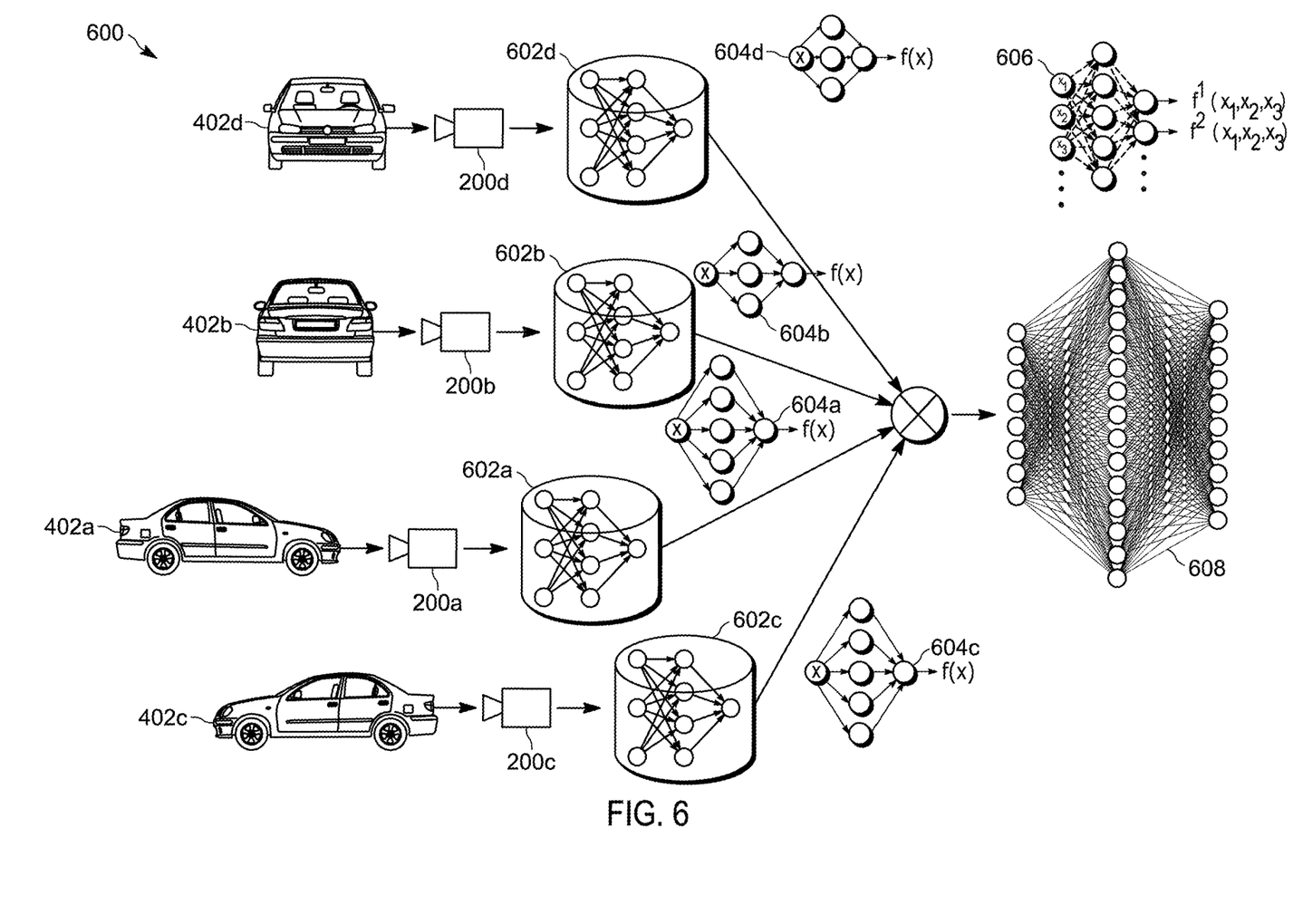
FIG. 6 illustrates a data flowchart 600 of the learning system of FIG. 3 in accordance with some embodiments.

FIG. 6 illustrates a data flowchart 600 of the object learning system 300 according to some embodiments. The views 402a-402d of the target 302 are received by the edge learning devices 200a-200d. Each of the edge learning devices 200a-200d implement an object learning process 602a-602d based on the data interpreted from the view 402a-402d received. In some embodiments, the complexity of the learning process of each edge learning device 200a-200d varies. This may depend on the processing ability of the edge learning device 200 or the assigned role. The preprocessed learning data determined by the edge learning device 200a-200d may include part of a learning process 604a-604d. In some embodiments, the learning process 604a-604d is an object learning data set. In such embodiments, one or more of the learning processes 604a-604d may be produced by a sub-neural network implemented by the edge learning device 200a-200d as described in more detail below.

Each of the learning processes 604a-604d are integrated or combined together to form an integrated learning process 606. The integrated learning process 606 may be generated by one of the edge learning devices 200a-200d implementing the method 500. The integrated learning process 606 may form part or all of the main object learning/neural network 608 of the object learning system 300. The learning processes 604a-604d may each be processed into one or more neurons (for example, neurons 107a-107c of FIG. 1) that may be combined together to form one or more layers (for example, layers 102, 104, and 106 of FIG. 1) or sublayers (for example, layers 109a and 109b of FIG. 1) of the main object learning/neural network 608. Depending on the viewpoint 402a-402d, the complexity of the learning process 606 varies. For example, as illustrated in FIG. 6, the object learning devices 200b and 200d implement a simple learning process 604b and 604d due to the small amount of data attainable from the front and rear views of the target 302. In comparison, the object learning devices 200a and 200c implement a more complicated learning process 604a and 604c that include more learning functions in order to process the greater amount of data attainable from the side views of the target 302.

In some embodiments, the object learning device 110 that collects the preprocessed object recognition data from the other object learning devices 110 within the network 100 may be assigned a master role (called a master node). The master role designates the object learning device 110 it is assigned to as the device 110 to initiate the method 500 and collect and process the preprocessed object recognition data received from the auxiliary object learning devices 110 for creating a classifier of a target. In some embodiments, as described below in regard to FIG. 7, the master node may transfer the master role to an auxiliary node (another object learning device 110) within the network 100.

Figure 7:
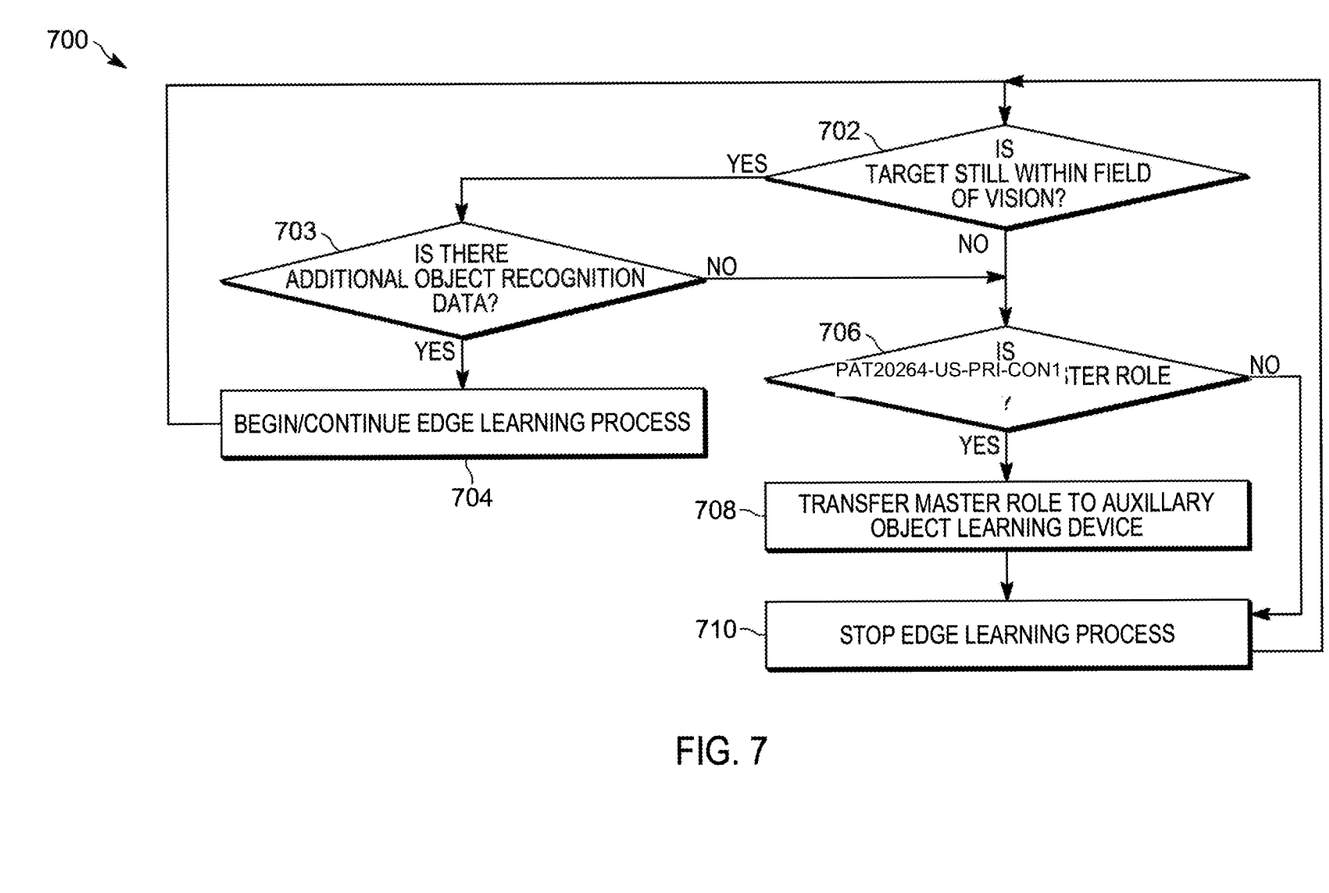
FIG. 7 is a flow chart of a master role management method according to some embodiments.

FIG. 7 illustrates a master role management method 700 according to some embodiments. The master role management method 700 is performed during blocks 502-510 of the method 500. As an example, the method 700 is described as being performed by the edge learning device 200a of the object learning system 300 illustrated in FIG. 3.

At block 702, the electronic processor 202 determines if the target 302 is within the field of view 304a of the edge learning device 200a. When the target 302 is within the field of view 304a, the electronic processor 202 may determine, at block 703, if the edge learning device 200a is collecting additional object recognition data of the target 302. The electronic processor 202 may be configured to determine this locally or receive a command from a remote device or system, for example another auxiliary edge learning device 200b-200d or the remote server 301. When it is determined that either or both the target 302 is within the field of view 304a and that there is additional object recognition data of the target 302 to collect, the edge learning device 200a initiates (or if already started, continues) the edge learning process at block 704, and continues at block 702 to determine or detect if the target 302 is within the field of view 304a. When it is determined that the edge learning device 200a is unable to detect the target 302 or the target 302 is not within the field of view 304a or no additional object recognition data is collected by the edge learning device 200a, if the edge learning device 200a is assigned the master role (determined at block 706), the master role is transferred to one of the auxiliary edge learning devices 200b-200d.

In some embodiments, the auxiliary edge learning devices 200b-200d within the system 300 (see FIG. 3) are compared to each other to determine an optimal object learning device to which the master role is transferred. The optimal object learning device of the system 300 may be determined based on at least one selected from the group consisting of processing ability, clearness (or quality) of view of the target 302, and an amount of additional object recognition data that is able to be collected. The processing ability is a degree in which the edge learning device 200a-200d is able to receive, analyze, and manipulate data, for example processing power. The processing ability may be determined based on hardware or software limitations of the edge learning device 200a-200d. The quality of view of the target 302 is based on an amount of the target 302 that is visible in the field of view of the edge learning device 200a-200d. The amount of additional object recognition data that is able to be collected is the amount of new characteristic data regarding the target 302 that is able to be received from an edge learning device 200a-200d of the system 300 that is not relatively similar to the object recognition data previously received within the system 300.

Figure 4D:
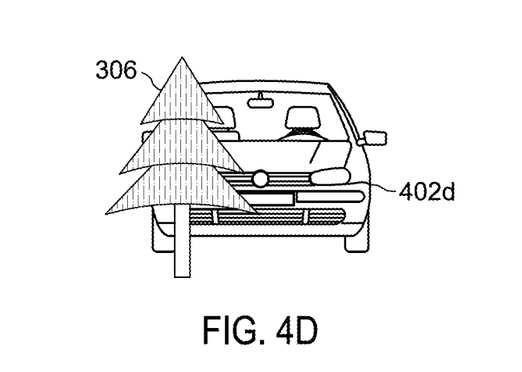
FIG. 4D is a view including a target captured by an object learning device of the system of FIG. 3.

For example, in FIG. 4D the view 402d of the target 302 captured by the edge learning device 200d is obstructed by the obstacle 306. In comparison, the view 402c of the target 302 captured by edge learning device 200c is unobstructed. However, as the target 302 is a vehicle in this example, the target 302 appears very similar in view 402c to the target 302 in view 402a of FIG. 4A. It may be the case that few or no characteristics of the target 302 for object learning or recognition determined by the edge learning device 200c are different from those already determined by the edge learning device 200a. The object recognition data collected from the edge learning device 200c may therefore be redundant and provide little additional data for object learning the target 302. The edge learning device 200b may be considered the optimal object learning device 110 as its view 402b of the rear of the target 302 offers the most object recognition data not yet collected (since no other node 200a-200d in the system 300 has the same or a similar view). In this example, the edge learning device 200a transfers the master role to the edge learning device 200c.

When the master role has been transferred, the electronic processor 202 stops executing the edge learning process of the method 500 and no longer transmits or receives preprocessed object recognition data until the target 302 is detected at block 702 again.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An object learning device comprising:
   a camera; and
   an electronic processor configured to
      detect a target within a first field of view of the camera;
      provide an identifier, based on the target, to at least one auxiliary object learning device having a second camera and the target within a second field of view of the second camera;
      initiate an edge learning process on the target, via the camera, to create first preprocessed object recognition data; and
      cause the first preprocessed object recognition data and a second preprocessed object recognition data created by the at least one auxiliary object learning device to be provided to a remote computing device via one or more intervening networks for creation of a classifier of the target based on the first and the second preprocessed objection recognition data.

2. The object learning device of claim 1, wherein the electronic processor is further configured to assign a role to the at least one auxiliary object learning device based on at least one selected from the group consisting of a processing ability of the auxiliary object learning device, a quality of view of the target, and an amount of additional object recognition data that is able to be collected.

3. The object learning device of claim 1, wherein the object learning device is assigned a master role and the electronic processor is further configured to transfer the master role to the at least one auxiliary object learning device when the object learning device is unable to detect the target or no additional object recognition data is collected by the object learning device.

4. The object learning device of claim 3, wherein the electronic processor is further configured to select the at least one auxiliary object learning device from a plurality of auxiliary object learning devices to transfer the master role to.

5. The object learning device of claim 1, wherein the electronic processor is further configured to receive, after causing the first preprocessed object recognition data and the second preprocessed object recognition data to be provided to the remote computing device, a created classifier back from the remote computing device.

6. A method of object learning on an edge of a distributed network, the method comprising:
   detecting, via a camera of a first object learning device, a target within a first field of view of the camera;
   providing an identifier, based on the target, to at least one auxiliary object learning device;
   initiating, via the electronic processor of the first object learning device, an object learning process on the target, creating a first preprocessed object recognition data; and
   causing the first preprocessed object recognition data and the second preprocessed object recognition data created by the at least one auxiliary object learning device to be provided to a remote computing device via one or more intervening networks for creation of a classifier of the target based on the first and the second preprocessed objection recognition data.

7. The method of claim 6, the method further comprising assigning a role to the at least one auxiliary device based on at least one selected from the group consisting of a processing ability of the auxiliary object learning device, a quality of view of the target, and an amount of additional object recognition data that is able to be collected.

8. The method of claim 7, wherein the first object learning device is assigned a master role and the method further comprising transferring the master role to the at least one auxiliary device when the first object learning device is unable to detect the target or no additional object recognition data is collected by the first object learning device.

9. The method of claim 8, the method further comprising determining, from a plurality of auxiliary object learning devices, an optimal auxiliary object learning device to transfer the master role to.

10. The method of claim 6, the method further comprising receiving, after causing the first preprocessed object recognition data and the second preprocessed object recognition data to be provided to the remote computing device, a created classifier back from the remote computing device.

11. An object learning system comprising:
    an auxiliary object learning device including a first electronic processor configured to initiate a first edge learning process on a target to create first preprocessed object recognition data; and
    an object learning device including a second electronic processor configured to provide an identifier, based on the target, to the auxiliary object learning device;
    initiate a second edge learning process on the target to create second preprocessed object recognition data; and
    cause the first preprocessed object recognition data and the second preprocessed object recognition data to be provided to a remote computing device via one or more intervening networks for creation of a classifier of the target based on the first and the second preprocessed objection recognition data.

12. The object learning system of claim 11, wherein the second electronic processor is further configured to assign a role to the auxiliary object learning device based on a processing ability of the auxiliary object learning device, a quality of view of the target, and an amount of additional object recognition data that is able to be collected.

13. The object learning system of claim 12, wherein the object learning device is assigned a master role and the second electronic processor is further configured to transfer the master role to the auxiliary object learning device when the object learning device is unable to detect the target or no additional object recognition data is collected by the object learning device.

14. The object learning system of claim 13, wherein the second electronic processor is further configured to determine from a plurality of auxiliary object learning devices, including the auxiliary object learning device, one of the plurality of auxiliary object learning devices to transfer the master role to.

15. The object learning device of claim 11, wherein the electronic processor is further configured to receive, after causing the first preprocessed object recognition data and the second preprocessed object recognition data to be provided to the remote computing device, a created classifier back from the remote computing device.

* * * * *